March 29, 1955

M. P. WHELAN 2,705,173

VEHICLE WHEEL

Filed Nov. 26, 1951

Matthew P. Whelan
INVENTOR.

BY
*Clarence A. O'Brien*
*and Harvey B. Jacobson*
Attorneys

United States Patent Office

2,705,173
Patented Mar. 29, 1955

2,705,173

VEHICLE WHEEL

Matthew P. Whelan, Conception Bay, Newfoundland, Canada

Application November 26, 1951, Serial No. 258,197

7 Claims. (Cl. 301—41)

This invention relates to new and useful improvements and structural refinements in vehicle wheels, and the principal object of the invention is to provide a wheel of the character herein described, which is particularly well adapted for traveling over soft terrain, such as deep snow, mud, marshy land, and the like.

Basically, this invention embodies the principle of snowshoes which, as is well known, are highly effective in traveling over soft terrain, an important feature of the invention residing in the adaptation of the snowshoe principle to a wheel, suitable for use on a vehicle to render the same worthy of travel over terrain where vehicles with conventional wheels would be inoperative.

Some of the advantages of the invention lie in its simplicity of construction, in its efficient and dependable operation and in its adaptability to economical manufacture.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
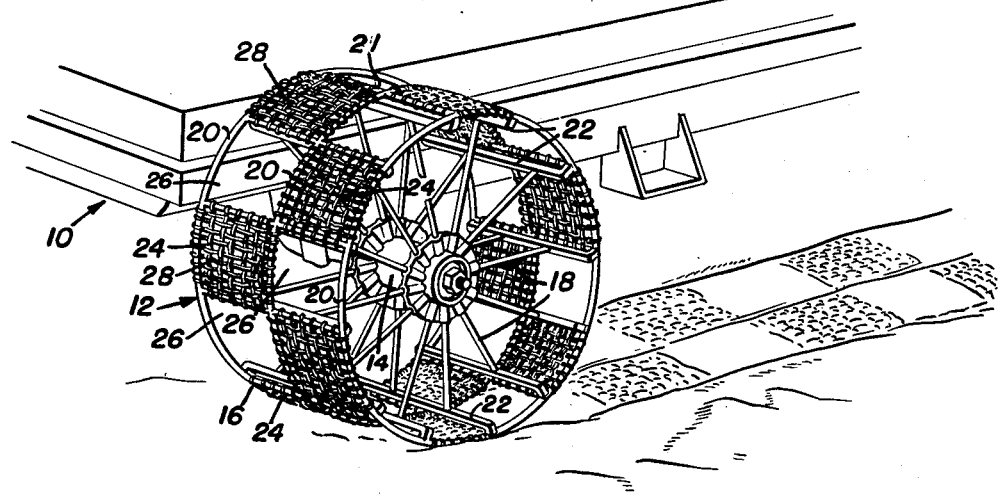
Figure 1 is a fragmentary perspective view of a vehicle, illustrating the wheel constructed in accordance with this invention.
Figure 2:
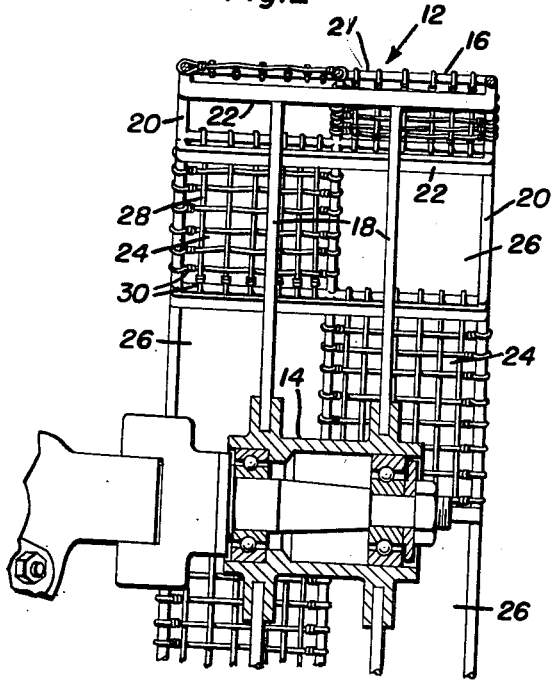
Figure 2 is a fragmentary vertical sectional view of the wheel.

Referring now to the accompanying drawings in detail, particularly Figures 1 and 2 thereof, the general reference character 10 designates any conventional vehicle having a plurality of wheels constructed in accordance with the invention, one of such wheels being designated generally by the reference character 12.

The wheel 12 comprises a conventional hub unit 14, a peripheral portion 16 and suitable means 18 for connecting the peripheral portion to the hub unit, such as for example, spokes, or the like.

The essence of novelty of the invention resides in the specific structure of the peripheral wheel portion, the same comprising a plurality of spaced, coaxial annular members 20 interconnected by transverse brace members 21 and a plurality of circumferentially spaced cross members 22 which are secured to the annular members 20 and have the spokes 18 secured thereto, the arrangement being such that the annular members 20 and the transverse brace members 21 define a plurality of juxtaposed, rectangular frames 24, 26.

These frames are open, but at least one of every two adjacent frames is provided with a tread panel 28 consisting of flexible net material which, of course, is sufficiently foraminous to facilitate passage of the wheel over soft terrain, such as snow, or the like. The tread panels 28 of net material may be secured to the annular members 20 and cross members 22 in any suitable manner, as exemplified at 30 in Figure 2.

Figure 3:
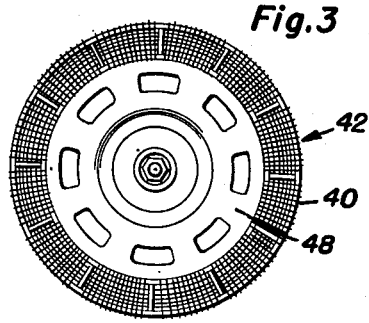
Figure 3 is a side elevational view illustrating a modified form of the wheel.
Figure 4:
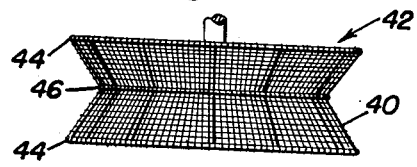
Figure 4 is a top plan view of the wheel shown in Figure 3.

Referring now to the modified embodiment of the invention illustrated in the accompanying Figures 3 and 4, this embodiment is substantially the same as the embodiment already described, with the exception that while the peripheral portion 16 of the embodiment 12 is substantially cylindrical, the peripheral portion 40 of the modified embodiment 42 is substantially V-shaped in cross section, having side edges 44 thereof of a substantially greater diameter than the center 46, as is best shown in Figure 4.

In the embodiment 42, the spokes between the hub and the peripheral portion of the wheel may be substituted by a disk 48, if so desired.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. A vehicle wheel of the type described, comprising a hub, a set of circumferentially spaced cross members connected to said hub, an annular member secured to said cross members at an intermediate portion thereof, a pair of annular members secured to opposite ends of said cross members, said annular members being disposed in coaxial relationship and positioned radially outwardly of said cross members, a plurality of transverse cross braces extending between said annular members whereby said annular and brace members coact to define a plurality of pairs of juxtaposed rectangular frames, and foraminous tread panels provided in at least one of every two adjacent frames.

2. The device as defined in claim 1 wherein said tread panels consist of flexible net material.

3. The device as defined in claim 1 wherein said peripheral portion has a cylindrical outer surface.

4. The device as defined in claim 1 wherein said peripheral portion is of a substantially V-shaped cross section, having side edges of a substantially greater diameter than the center thereof.

5. A vehicle wheel of the type described comprising a hub, spokes extending radially of said hub, a set of circumferentially spaced cross members secured to said spokes, a plurality of coaxial annular members positioned radially outwardly of and secured to said cross members, a plurality of transverse members extending between said annular members and coacting therewith in defining a plurality of juxtaposed rectangular frames, and foraminous tread panels provided in at least one of every two adjacent frames.

6. The combination of claim 1 wherein the tread panels are provided in one frame of each pair and in every other adjacent frame.

7. The combination of claim 1 wherein said first named annular member is of smaller diameter than the last named annular members.

References Cited in the file of this patent

UNITED STATES PATENTS

| | | |
|---|---|---|
| 490,391 | Libbey | Jan. 24, 1893 |
| 1,425,334 | Pedroarena et al. | Aug. 8, 1922 |

FOREIGN PATENTS

| | | |
|---|---|---|
| 27,204 | Sweden | May 1, 1908 |

(Corresponding U. S. 935,104, Sept. 28, 1909)